United States Patent
Brooks

[19]

[11] Patent Number: 6,037,538
[45] Date of Patent: Mar. 14, 2000

[54] CABLE RACEWAY

[76] Inventor: Gary Douglas Brooks, 560 Elsberry Rd., Apollo Beach, Fla. 33572

[21] Appl. No.: 09/237,155

[22] Filed: Jan. 25, 1999

Related U.S. Application Data

[63] Continuation of application No. 08/848,046, Apr. 28, 1997, abandoned.

[51] Int. Cl.[7] .................................................. H02G 3/04
[52] U.S. Cl. ............................................................ 174/48
[58] Field of Search .............................. 174/48; 52/238.1, 52/239, 220.2, 220.6, 220.7

[56] References Cited

U.S. PATENT DOCUMENTS

| | | | |
|---|---|---|---|
| 3,195,698 | 7/1965 | Codrea | 174/48 X |
| 4,354,052 | 10/1982 | Albany et al. | 174/48 |
| 4,375,010 | 2/1983 | Mollenkopf | 174/48 |
| 4,631,881 | 12/1986 | Charman | 52/238.1 X |
| 4,685,255 | 8/1987 | Kelley | 52/36 |
| 4,703,985 | 11/1987 | Finkbeiner et al. | 439/207 |
| 4,716,698 | 1/1988 | Wilson et al. | 52/239 |
| 4,716,985 | 1/1988 | Wilson et al. | 52/239 |
| 4,771,583 | 9/1988 | Ball et al. | 174/48 X |
| 4,795,355 | 1/1989 | Dorn et al. | 174/48 X |
| 4,902,852 | 2/1990 | Wuertz | 174/48 |
| 4,918,886 | 4/1990 | Benoit et al. | 174/48 X |
| 5,025,603 | 6/1991 | Johnson | 52/239 X |
| 5,152,698 | 10/1992 | Jublin et al. | 439/215 |
| 5,277,007 | 1/1994 | Hellwig et al. | 52/220.7 |

*Primary Examiner*—Dean A. Reichard
*Attorney, Agent, or Firm*—Jack E. Dominik

[57] ABSTRACT

A system, method, and components for removably securing communication cables to the upper portion of work station divider panels is shown. Key to the installation is the telecommunication removable raceway which contains an upper inverted U-shaped cover, and a mating H-shaped panel grip channel. The H-shaped lower channel has a pair of lower legs depending from a central web, and upper legs extending upwardly from the web to matingly engage the inverted U-shaped member. The lower legs are proportioned to flexibly and clampingly engage the upper portion of the work station divider. A top feed tube is provided to lead the cabling downwardly from inside the drop ceiling or other ceiling portion, and coact with a top feed cap which is provided at preselected stations along the main raceway to interrupt the inverted U-shaped cover. Additionally, corner members, end cap members, wire trough managers, and station drop feeds are provided to the end so that the cable may be routed in accordance with the location of the work station, and more particularly the needs of each particular work station for coupling to the main communication source.

2 Claims, 10 Drawing Sheets

CABLE RACEWAY

This application is a Continuation Application of co-pending application Ser. No. 08/848,046, filed on Apr. 28, 1997 now abandoned.

FIELD OF THE INVENTION

The present invention relates to communications and information systems utilized in offices, particularly where movable wall dividers are utilized to divide work space areas.

BACKGROUND OF THE INVENTION

Figure 6:
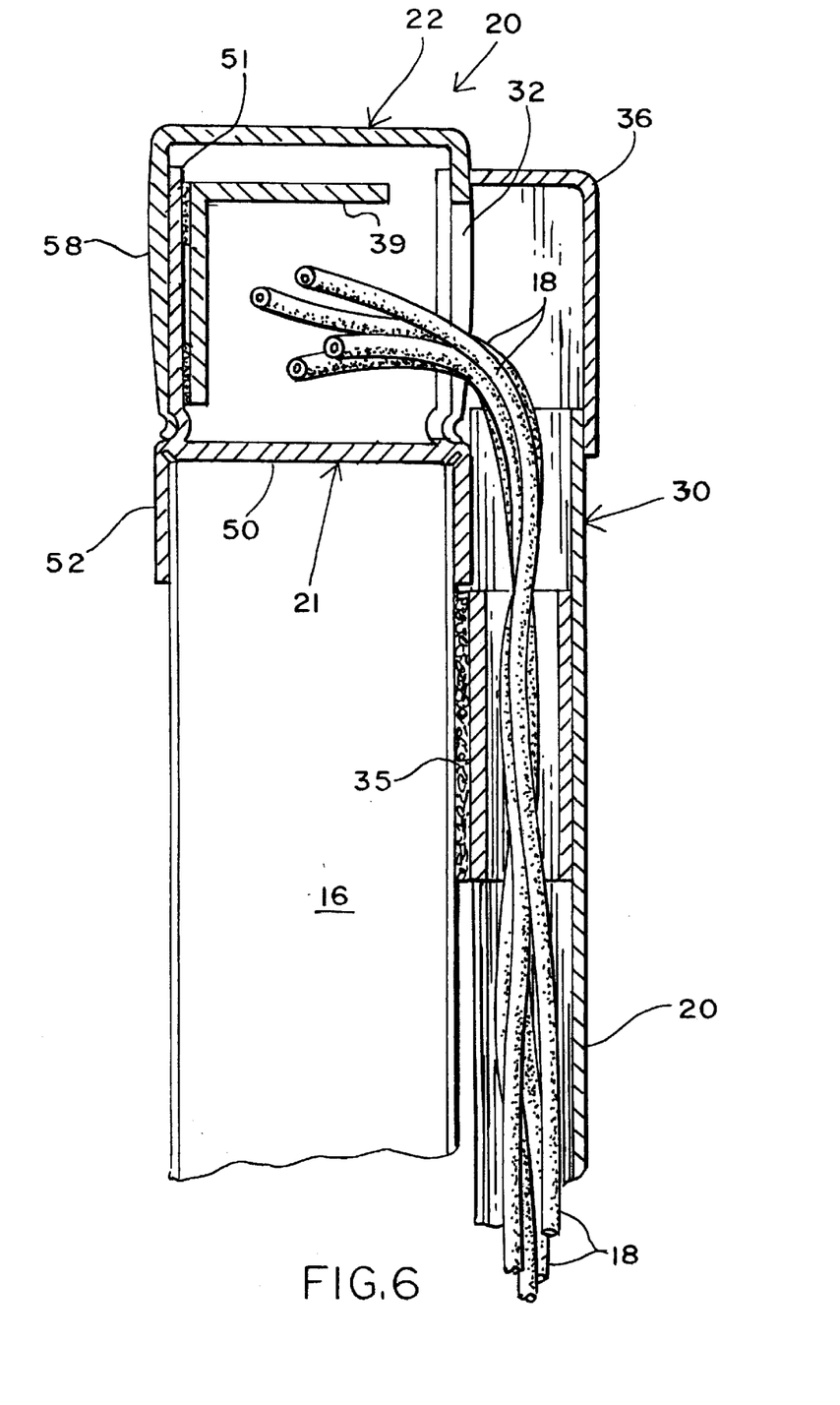
FIG. 6 is a transverse sectional view taken along section line 6—6 of FIG. 5, showing the cabling in place and all of the components to coordinate the same to pass through the vertical channel.

The present invention is directed to supplying offices which are generally made up into work stations by portable or movable wall panels in such a fashion that communications, whether telephone, computer, networking, or file serving components are involved. Exemplary patents are U.S. Pat. Nos. 4,685,255; 4,703,985; and 5,152,698. As to U.S. Pat. No. 4,685,255 for example, numerous cubicals appear in the structure, but the wiring as shown in FIG. 6 is external. Also, the installation is semi-permanent rather than flexible and movable. U.S. Pat. No. 4,703,985 discloses curvilinear panels. Finally, more recently issued U.S. Pat. No. 5,152,698 is directed to a very comprehensive system utilizing a labyrinth of raceways of individual segments, primarily mounted on the floor.

Interior walls of various dimensions and sizes are commonly utilized in dividing work stations in an office environment. Some are portable and modular, some can be prefabricated from panels. Some, by means of a floater, can be removably secured to the floor. Most divider walls have a fabric covering but they could be covered with a plastic sheet or metal cladding. In most instances in the office installation, however, the upper edge of the work station dividers are in a uniform plane throughout the office installation. The present invention is addressed to removably securing a cable management system along the upper edges of the work station dividers in such a fashion that the cabling necessary for communication and even power can be organized and encapsulated in a system which itself is modular and adaptable to varying dimensions, by clampingly engaging the upper edge of the work station dividers, coordinating the cabling system interior of the organizer portion, and then covering the same in a concealed relatively dust-proof environment.

What the prior art illustrates and emphasizes by silence, is the desirability of utilizing the top portion of the work station providers to carry the communications cables, and receive them from runners coming down from a drop ceiling. By utilizing a cable network coming through a drop ceiling, expensive concrete modification as is involved with floor mounted systems is avoided. Moreover, because most drop ceilings have modular squares of some two feet at least, the squares can readily be open, communications cable routed through the same, and then closed after providing for communication to the work stations involved.

SUMMARY OF THE INVENTION

The present invention is directed to a system, method, and components for removably securing communication cables to the upper portion of work station divider panels. Key to the installation is the telecommunication removable raceway which contains an upper inverted U-shaped cover, and a mating H-shaped panel grip channel. The H-shaped lower channel has a pair of lower legs depending from a central web, and upper legs extending upwardly from the web to matingly engage the inverted U-shaped member. The lower legs are proportioned to flexibly and clampingly engage the upper portion of the work station divider. A top feed tube is provided to lead the cabling downwardly from inside the drop ceiling or other ceiling portion, and coact with a top feed cap which is provided at preselected stations along the main raceway to interrupt the inverted U-shaped cover. Additionally, corner members, end cap members, wire trough managers, and station drop feeds are provided to the end that the cable may be routed in accordance with the location of the work station, and more particularly the needs of each particular work station for coupling to the main communication source. Additionally, a drop channel assembly is provided to permit encapsulating the cables which, drop down from the channel mounted on top of the room dividers to pass through an opening in the work station desk and thereafter be fed in concealed manner to the necessary work stations. The method of the invention comprises the steps of moving the cable raceway to a position on top of the wall panel dividers once the location pattern for the wall panel dividers is established. Thereafter, the cables are positioned in an auxiliary sling to route the same empirically throughout the office assembly prior to "cutting and fitting" with the various top feed channels, top feed caps, corners, end caps, and the like. Thereafter, the pieces for encapsulating in raceway fashion are positioned onto the various panels, the cabling laid therein, the U-shaped inverted cover piece positioned in place, and the cabling secured where needed.

Accordingly, it is a principal object of the present invention to provide a raceway system for communications cables which adapts itself portably and replaceably to discipline the routing of the communications cables over the top of the wall divider panels to thereby totally eliminate unnecessary wiring, cabling, and the like through the floor structure.

A further advantage of the present invention is to eliminate baseboard wiring and cabling systems which are relatively permanent, and which when modified the work station structure are difficult to revise.

An even further related aspect of the invention is the method of removably securing the cabling in place so that if work stations are modified to add additional cables, the raceway is already in place. Alternatively, if one work station is further divided, or alternatively expanded into a conference area, the dividing or the expansion can be accommodated by simply replacing or modifying the raceways without major structural alteration to the office space.

Yet another object of the present invention is to provide a system for communication cable management which is capable of installation by relatively unskilled persons in the art of providing raceways, and as a consequence permits the skilled installer of the equipment itself to handle the installation of the raceways and the cabling to them. Stated another way, the communications person can, with confidence, proceed with a multi-work station installation without requiring the skills of an electrical contractor, a subcontractor for the removal of permanent walls or flooring, or otherwise accomplish severe structural alteration to the office space.

BRIEF DESCRIPTION OF THE ILLUSTRATIVE DRAWINGS

Further objects and advantages of the present invention will become apparent as the following description of an illustrative embodiment proceeds, taken in conjunction with the accompanying drawings, in which:

FIGS. 19(*a*), 19(*b*), 19(*c*), 19(*d*), 19(*e*), 19(*f*), and 19(*g*) are perspective views of the critical parts for the raceway system.

DESCRIPTION OF A PREFERRED EMBODIMENT

Figure 1:
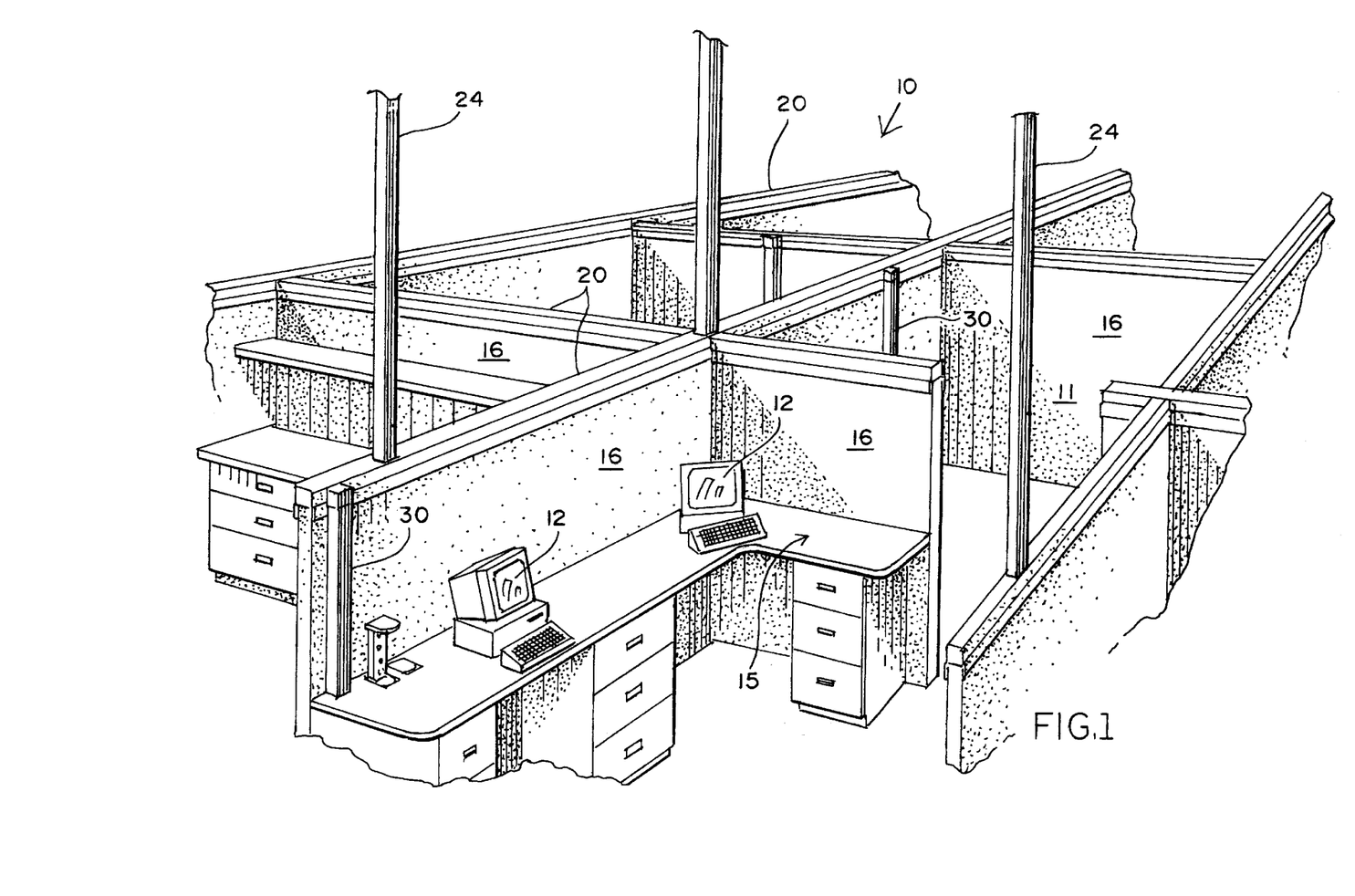
FIG. 1 is a perspective partially broken view of an office divided up into numerous work stations by means of removable panels, and showing in broad outline how the top feed descends downwardly into the raceways which are removably positioned on top of each of the wall panels.

The present invention of a raceway system and method are best illustrated in the environment of alternate use which is illustrated in FIG. 1. In FIG. 1 it will be seen that the office 10 includes work stations 11, screens 12, desk 15, and dividers 16.

The principal raceway or telecommunication channel 20 is positioned to ride atop the various dividers 16. The raceway 20, is made up of an H-channel 21 which is the underneath portion, and an inverted U-shaped channel which telescopingly covers the top of the upper portion of the H-channel. The raceway 20 is fed cabling from the top feed 24 which comes down from a drop ceiling (not shown) but may also be otherwise fed into the raceways.

Figure 16:
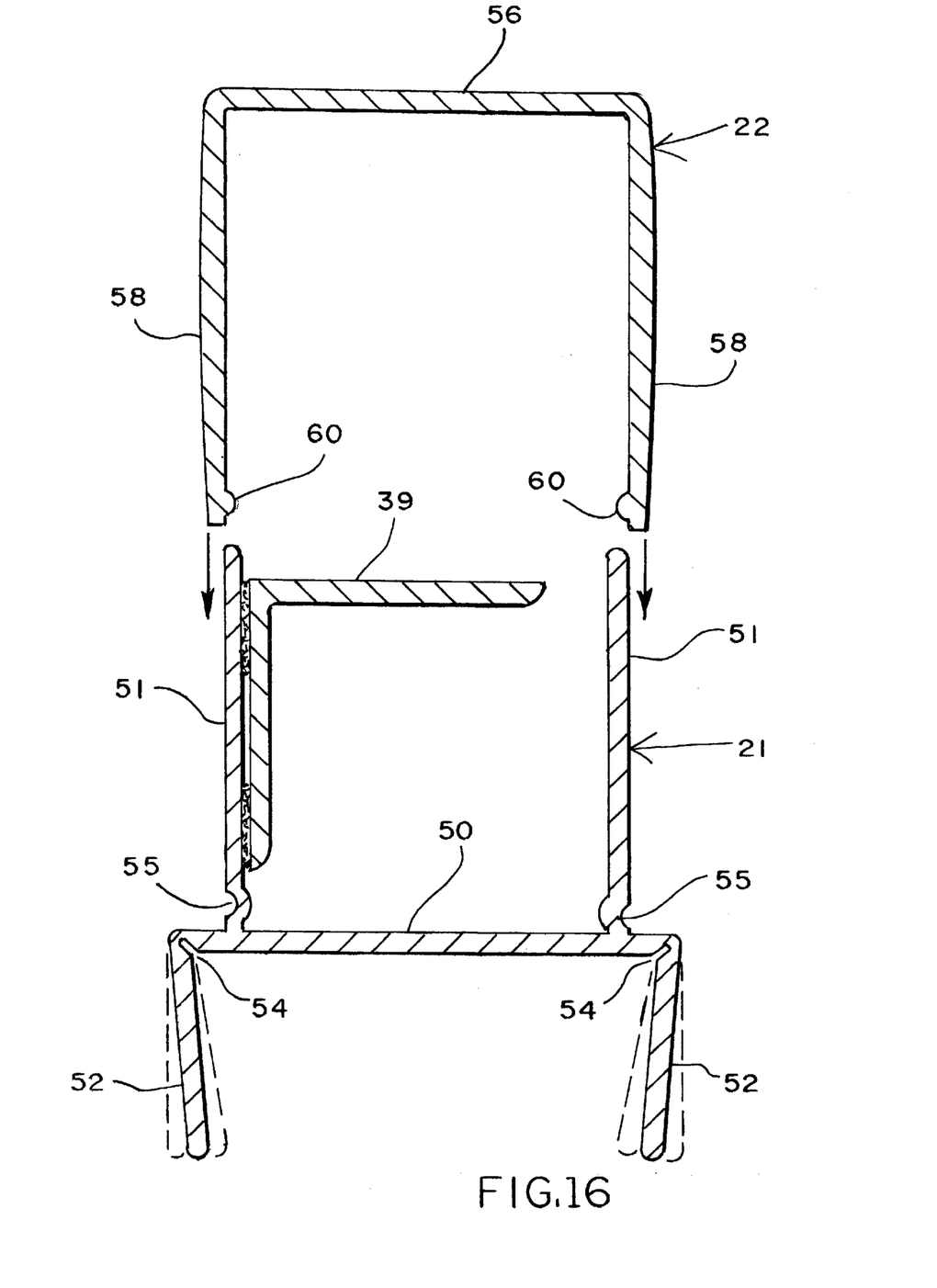
FIG. 16 is yet another enlarged transverse section view of the H-shaped member showing specifically the slots form in the extrusion to permit a living hinge relationship between the downwardly extending legs which, in turn, clampingly engage the upper portion of the panel.

Turning now to FIG. 16, the details of an exemplary H channel 21 is shown. There it will be seen that the H frame 21 includes a central web 50. Extending upwardly from the central web 50 are the channel walls 51. The walls 51 are parallel and spaced inwardly from the remote edges of the web 50. Extending downwardly are the clamping legs 52. A pair of opposed slots 54 are formed at the end of the web 50 on its underneath side and at its remote edges to provide for a living hinge effect of clamping legs 52. Thus, when the legs 52, are spread slightly to engage the upper portion of the divider 16, the memory in the plastic will cause the same to return and clampingly engage the wall divider 16. Similarly a pair of opposed detents 55 are provided at the lower edge of the opposed channel walls 51 to permit flexure there as well as a snap acting connection to the beads 60.

Figure 12:
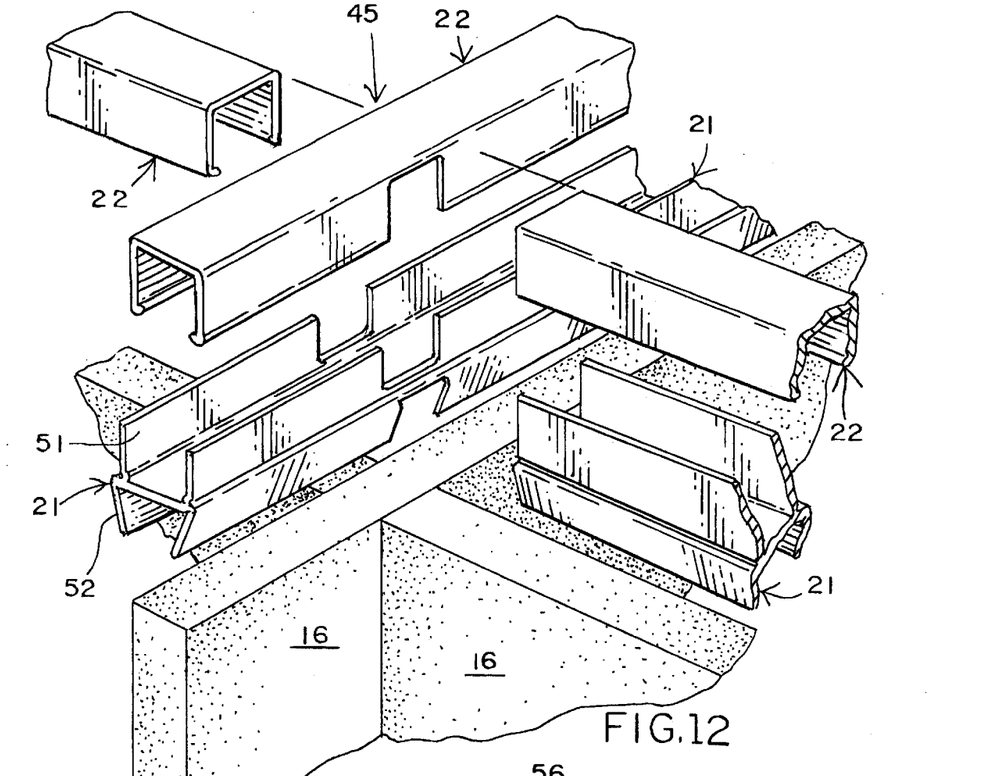
FIG. 12 is an exploded perspective view showing the various elements of the raceway connected at the intersection of perpendicular divider panels.
Figure 13:
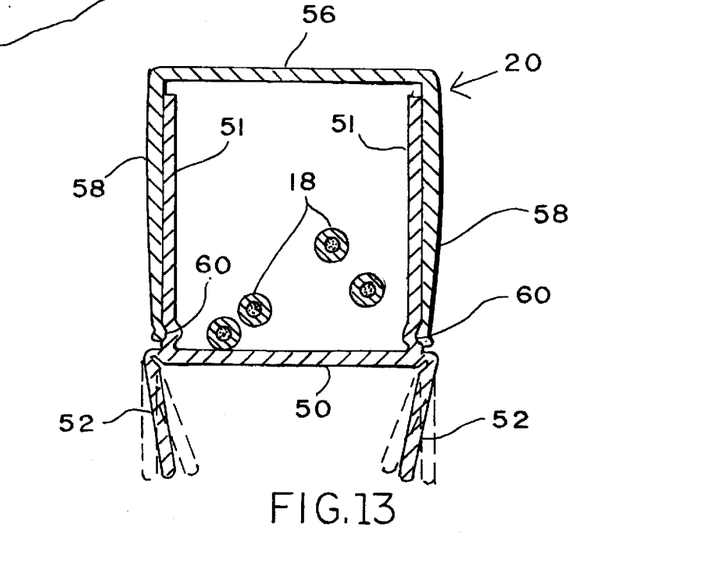
FIG. 13 is a partially diagrammatic view showing in phantom lines how the lower legs of the H-shaped portion of the principal raceway flex to engage the top of the panel.

Turning now to FIG. 12, it will be seen that the raceway 20 does include the H channel 21 and the inverted U-shaped channel 22. The U-shaped channel 22, in turn, has a channel web 56 and two depending leg portions 58. The depending leg portions 58 clampingly engage the walls 51 of the H-shaped channel 21 as previously described on FIG. 16. The flexure of the clamping legs 52 of the H channel is shown in phantom lines at the lower portion of FIG. 13.

Figure 14:
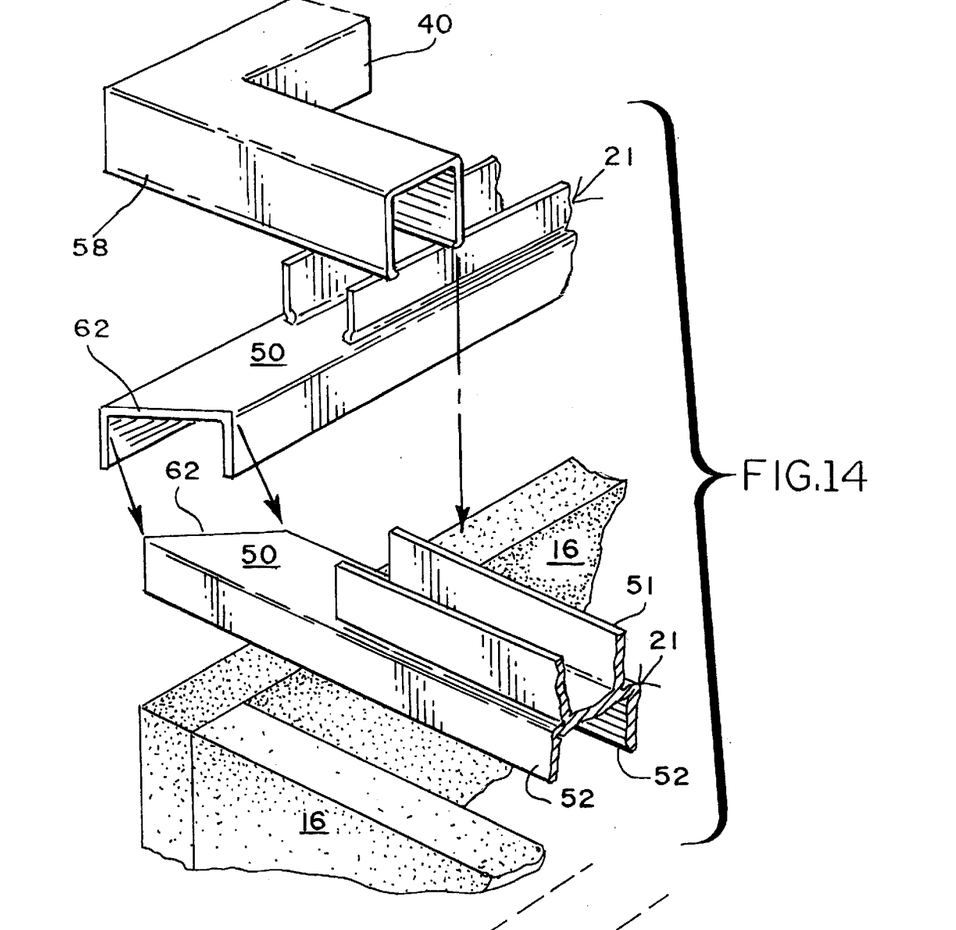
FIG. 14 is yet another exploded perspective view illustrating a typical corner without passing through the corner to the rear side where another work station might be placed.
Figure 15:
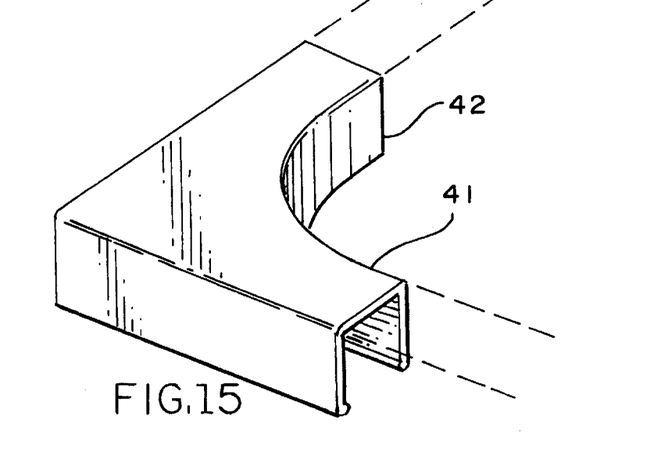
FIG. 15 is an alternative embodiment of a cap member showing a curvilinear portion which is provided to accommodate fiber optic cables which cannot bend over the shorter radiuses of other communications cables.

Finally, it should be noted that, as shown in FIGS. 14 and 15, there are standard corners 40 for a 90° bend in the raceway 20, and that the upper portion of the H-shaped channel 21 is mitered at its end to receive the corner 40 which has depending legs 58' to clampingly engage the upper sidewalls 51 of the H-shaped channel 21. This is well shown in FIG. 14. FIG. 15, on the other hand, discloses a fiber-optic corner 41 which operates much in the same fashion as the corner 40, but is provided with a radius 42 to accommodate the longer radius of turn necessary when fiber-optic cable is inserted.

Figures 2, 3, 4, 5:
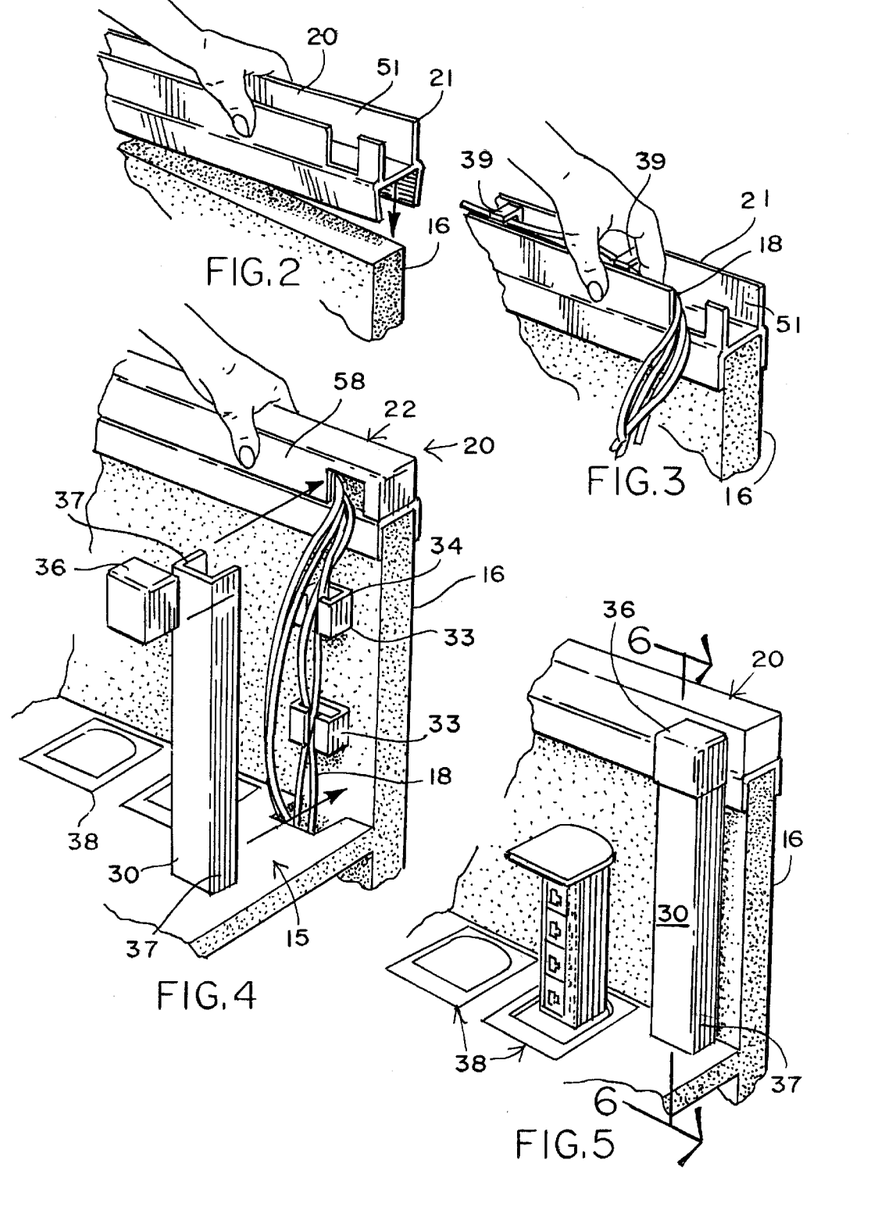
FIG. 2 illustrates diagrammatically and in perspective the positioning of the main channel on top of the wall panel.
FIG. 3 is a view subsequent to FIG. 2 showing how the cables are routed into the upper portion of the lower H-shaped members and then routed through the opening to extend downwardly.
FIG. 4 is a view subsequent to FIG. 3 but showing how the inverted U-shaped cap portion of the raceway is positioned on top of the H-shaped member and is provided with an exit port to permit cables to extend downwardly as oriented by spaced control members.
FIG. 5 illustrates the completed installation after the vertical cable members are shielded by the drop cover and drop cover cap, all in their shielded installed relationship as shown in FIG. 5.

Shown now in FIG. 6 are the details of how wiring is run downwardly through the drop feed assembly 30. The drop feed assembly 30 is secured to drop feed anchors 33 as shown in FIG. 6 and as also shown in place in FIG. 4. The drop feed anchors are essentially members having an anchor web 34 with extending side portions, and are secured primarily by means of a velcro anchor 35 as shown particularly in FIG. 6. The top cap 36 is thereafter positioned in place in sequence as shown in FIGS. 4, and 5. Further as shown in FIG. 5, a pop-up assembly 38 may be provided in the desk 15 for identifying the control areas which are being utilized.

Turning back now to FIG. 6 again, it will be further seen that the raceway 20 is fitted atop the wall divider 16 and more specifically it will be seen how the clamping legs 52 of the H-shaped channel 21 engage the upper portion of the wall panel 16. The inverted U-shaped channel 22 is snapfittingly engaged to the two upper walls 51 of the U-shaped member with the detent 55 of the H-shaped member 21 being engaged by the extending runner bead 60 of the inverted U-shaped clamp 22. The web 50 of the H-shaped member rides atop the panel 16 and separates the wire 18 from the partition wall 16. Also to be noted is how the top cap 36 fits atop the drop feed assembly 30, and optional cable cover 39 is installed.

Figure 7:
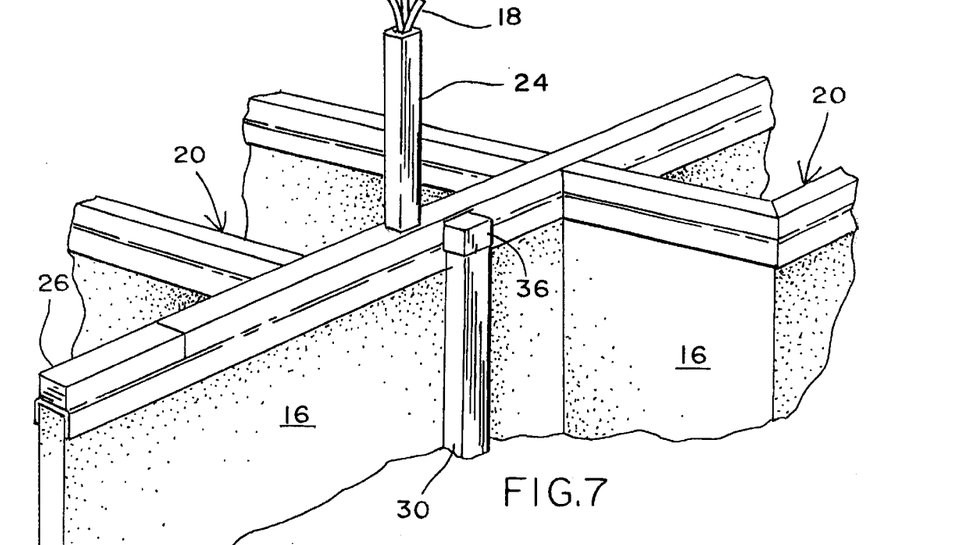
FIG. 7 is an enlarged perspective view partially broken to show how the corners between the portable panels are the subject of the routing of the raceway in all directions.
Figure 8:
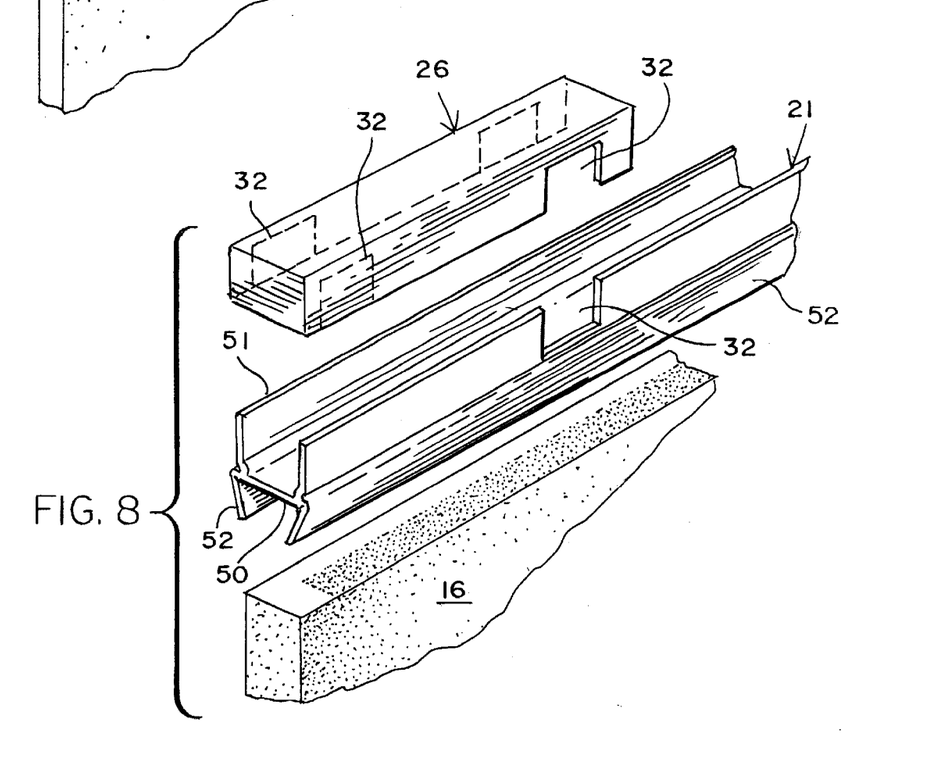
FIG. 8 is yet another exploded perspective view of the H-shaped and U-shaped members which form the principal raceway showing the same atop the panel for lowering and positioning in place thereon.

Now by turning to FIG. 7 it will be seen that the completed assembly shown there shows the wall panels 16 in perpendicular relationship to each other, with the top feed 24 dropping directly into the raceway assembly 20 and all wires and cables are hidden. As shown in FIG. 8, another aspect of lowering the H-shaped channel 21 on top of the wall divider panel 16 is shown, with the inverted U-shaped member having a variety of ports 32 for leading the wire or the cabling out of the raceway channel 20.

Figure 9:
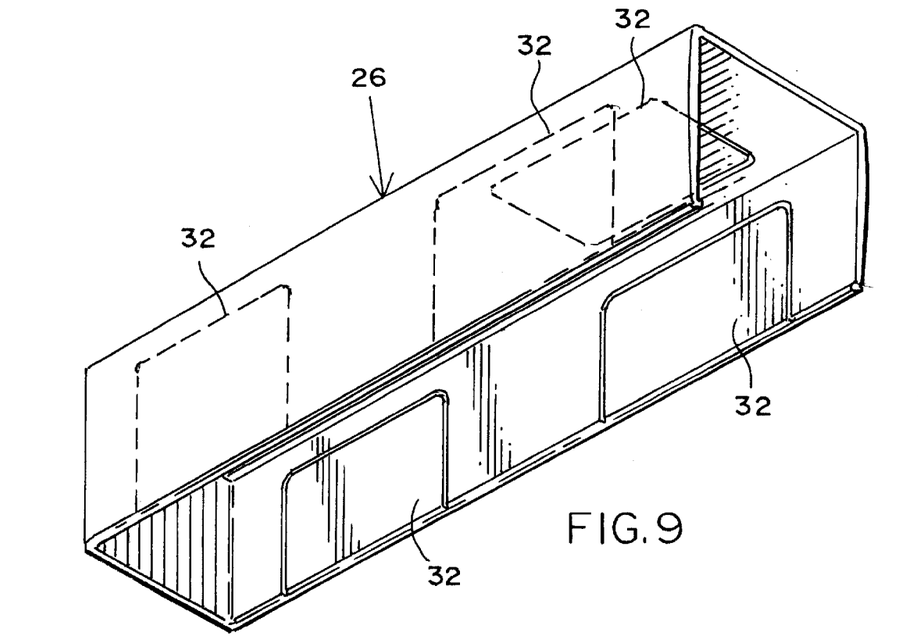
FIG. 9 is a bottom view of the U-shaped member showing the various knock-outs which can be employed for routing.

FIG. 9 is a further indication of how the ports 32 may be formed, most of the same by on the job cutouts which are on the inverted U-shaped channel 22 as shown.

Figure 10:
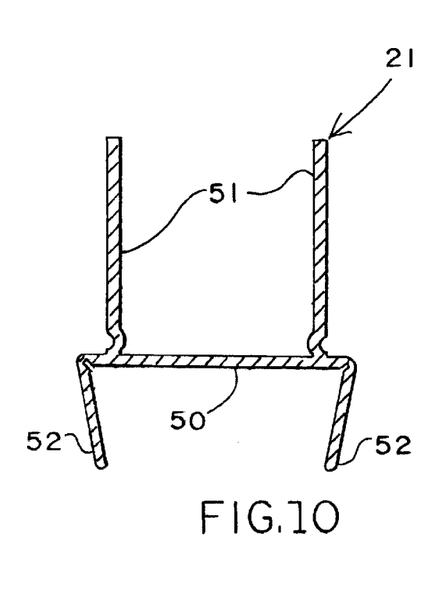
FIG. 10 is a transverse sectional view of the wide shoulder H-member of the raceway.
Figure 11:
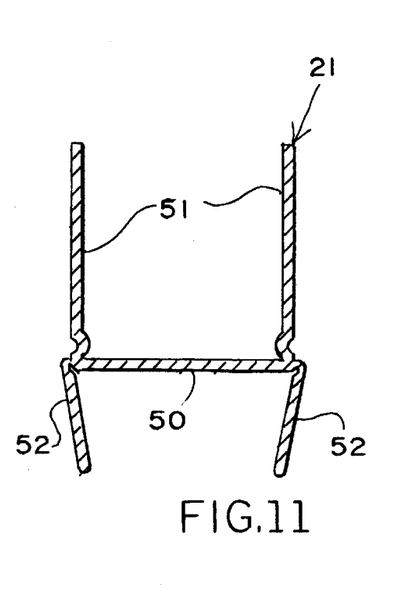
FIG. 11 is a transverse sectional view of the narrow shoulder H-shaped member for the raceway.

FIGS. 10 and 11 show the difference between the wide shoulder version of the H channel 21 and the narrow shoulder version of the H channel 21, neither of which are designated separately by a reference numeral.

Turning now to FIG. 12, it will be seen how the typical corner intersection 45 is made up of the perpendicularly oriented channel sections 21, 22 and provided with notches so that a cross raceway is provided when the same are assembled and that permits wiring or cabling to be run in four different directions. Two of those directions are shown, and were previously described with regard to FIG. 14.

Figure 17:
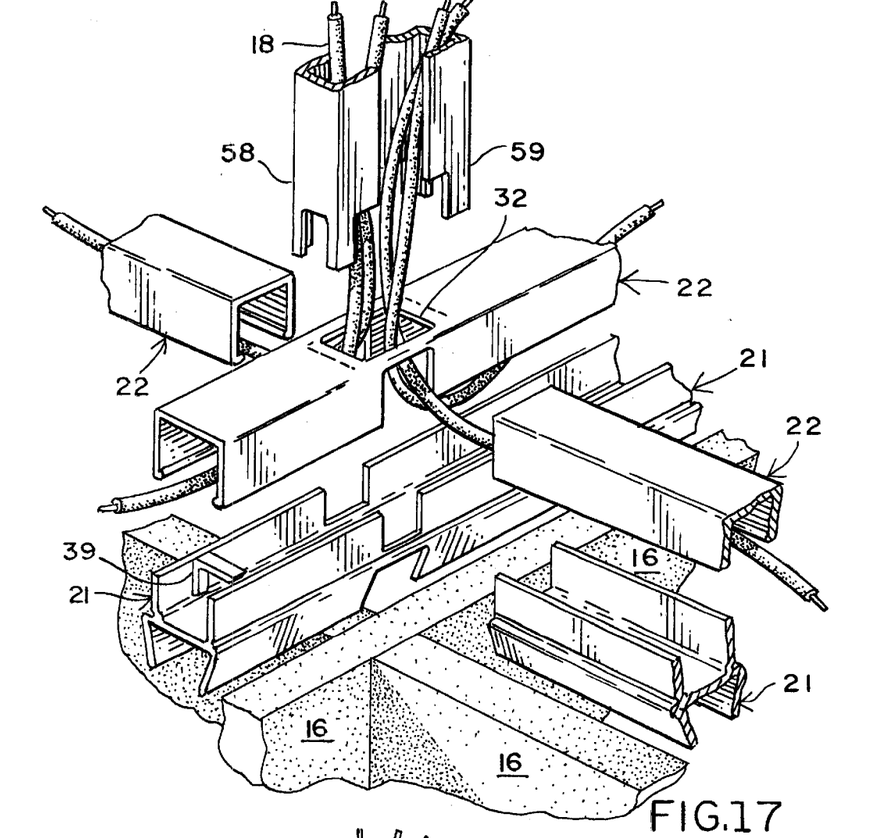
FIG. 17 is a further perspective view of a corner intersection resembling that shown in FIG. 12, but illustrating how the wiring may be run.
Figure 18:
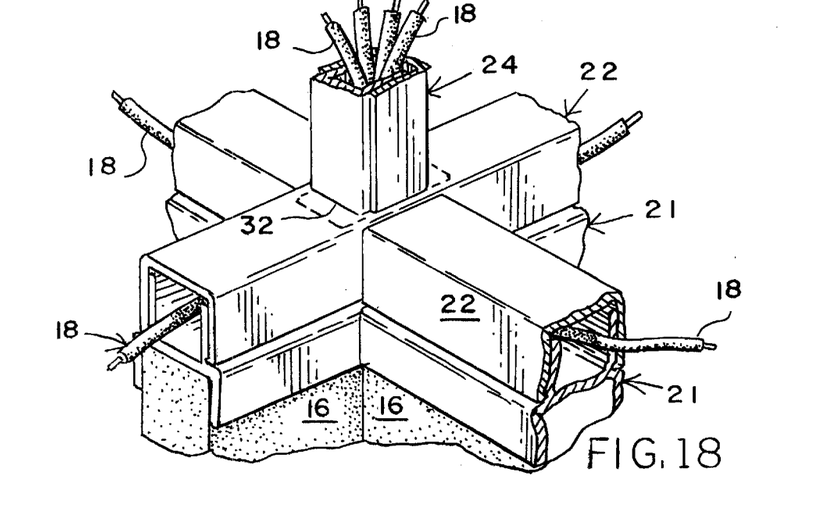
FIG. 18 is a subsequent assembled view of the components shown in FIG. 17 illustrating how they are shielded from view when the elements are assembled.

Turning now to FIG. 17, the further involvement of the top feed 24 appears. There it will be seen that the top feed 24, in turn, is made up of two opposed U-shaped members 58, 59 each of which clampingly engages the other and which permits the same to be smaller or larger depending upon the amount of cabling which is passed therethrough. The wires being passed as shown in FIG. 17 are four in number, with the same being led in four separate directions. Once the corner assembly of FIG. 17 is in its assembled configuration, the appearance is as shown in FIG. 18 where all of the four wires are hidden and yet all of the four wires extend in four separate directions of mutual perpendicularity.

The method of the present invention is illustrated in its simplest form in FIGS. 2-5. There it will be seen that the H-shaped member 21 of the raceway 20 is positioned on top of the wall divider 16. Subsequently, as shown in FIG. 3, the cabling 18 is placed in the upper portion of the H-shaped channel 28 between the sidewalls 51. Then the cable is passed through the anchor web 34 secured by means of velcro or other removable fastener to the panel wall 16. The cables are led downwardly through the spaced walls 37. Then the drop feed cover 30 is positioned over the walls 37, as shown by the arrows in FIG. 4. The assembly of the drop feed 30 is then completed by applying the drop feed top cap 36 and the completed assembly is then illustrated in FIG. 5. To be noted in FIG. 5 is the optional pop-up 38. FIG. 6 illustrates the interior portion of the assembly when completed as illustrated in FIG. 5. Other aspects of the method are illustrated in FIGS. 12, 14, 15, 16, and 17, the most complete of which is shown in FIG. 17 at the four corner intersection where the cables or wires 18 can be routed in four separate directions. The corner assembly is formed as shown in FIG. 14 by mitering off the upper portion of the H-shaped channel 21 where the corner is to be positioned thereby presenting miter joint faces 62. To be noted in FIG. 17, however, the miter joint faces 62 are not required where there is a directed interface with an opposed H-shaped member 21.

Figure 19A:
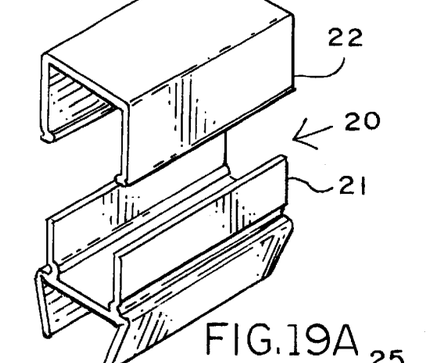
Figure 19B:
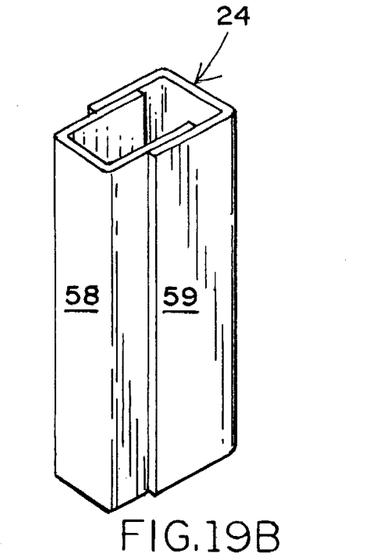
Figure 19C:
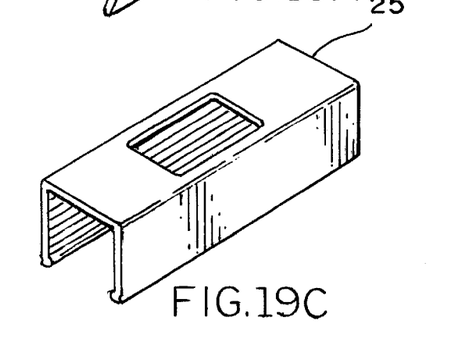
Figure 19D:
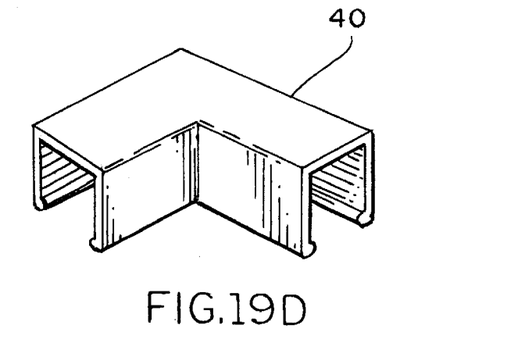
Figure 19E:
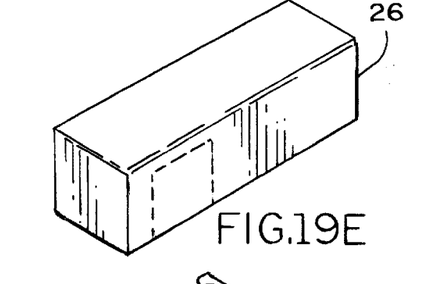
Figure 19F:
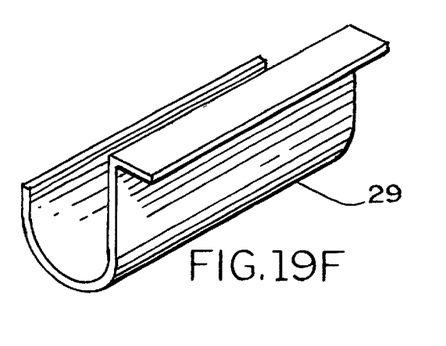
Figure 19G:
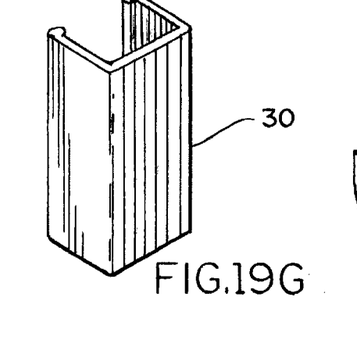

Turning now to FIGS. 19(a) through 19(g) inclusive, a summary of the principal components is shown in perspective. FIG. 19(a) shows the raceway 20 in exploded perspective with the H-shaped channel 21 at the bottom and the inverted U-shaped channel 22 at the top. FIG. 19(b) is a top feed tube 24. FIG. 19(c) is a top feed cap 25. FIG. 19(d) shows the corner 40. FIG. 19(e) is an end cap 26 usually applied at one end or the other of the raceway 20. FIG. 19(f) shows an optional wire management trough 29 which could be used instead of the cable cover 39 shown in FIG. 16. Finally, FIG. 19(g) shows the drop feed assembly 30.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A system for channel mounting of cabling for use on top of portable wall panels, without penetrating the portable wall panels, each of which has an essentially continuous uninterrupted linear upper edge comprising, in combination, a clamping member for placement atop said portable walls having a central continuous web perpendicular to resiliently secured opposed continuous depending legs and upstanding walls forming a cable guide channel atop said clamping member continuous web, and a cover member for removable securement to said cable guide channel, whereby said clamping member, cable guide channel, and cover member can be removably secured to the top of a wall panel and cabling for communications to be installed without defacing the wall panel, guided for installation temporarily by the guide channel, and thereafter covered in use by the cover member.

2. A system for channel mounting of cabling for use on the top edge of portable wall panels comprising, in combination, H-shaped means having depending opposed flexing legs for removably and clampingly securing a mounting member to an upper portion of a wall panel top edge along the entire length of said top edge, means for guiding cable temporarily atop said mounting member while said mounting member is secured to the upper portion of the wall panel, and means for covering and securing the cable inside the means for guiding the cable and for securement of said cable to said means for clampingly securing, whereby the aforesaid means for guiding can be removably secured to said top of said portable wall panels and the cable for communications can be installed in said means for guiding, guided for installation temporarily by the means for guiding the cable, and thereafter covered for ultimate usage by said means for covering and securing.

* * * * *